Patented Dec. 19, 1950

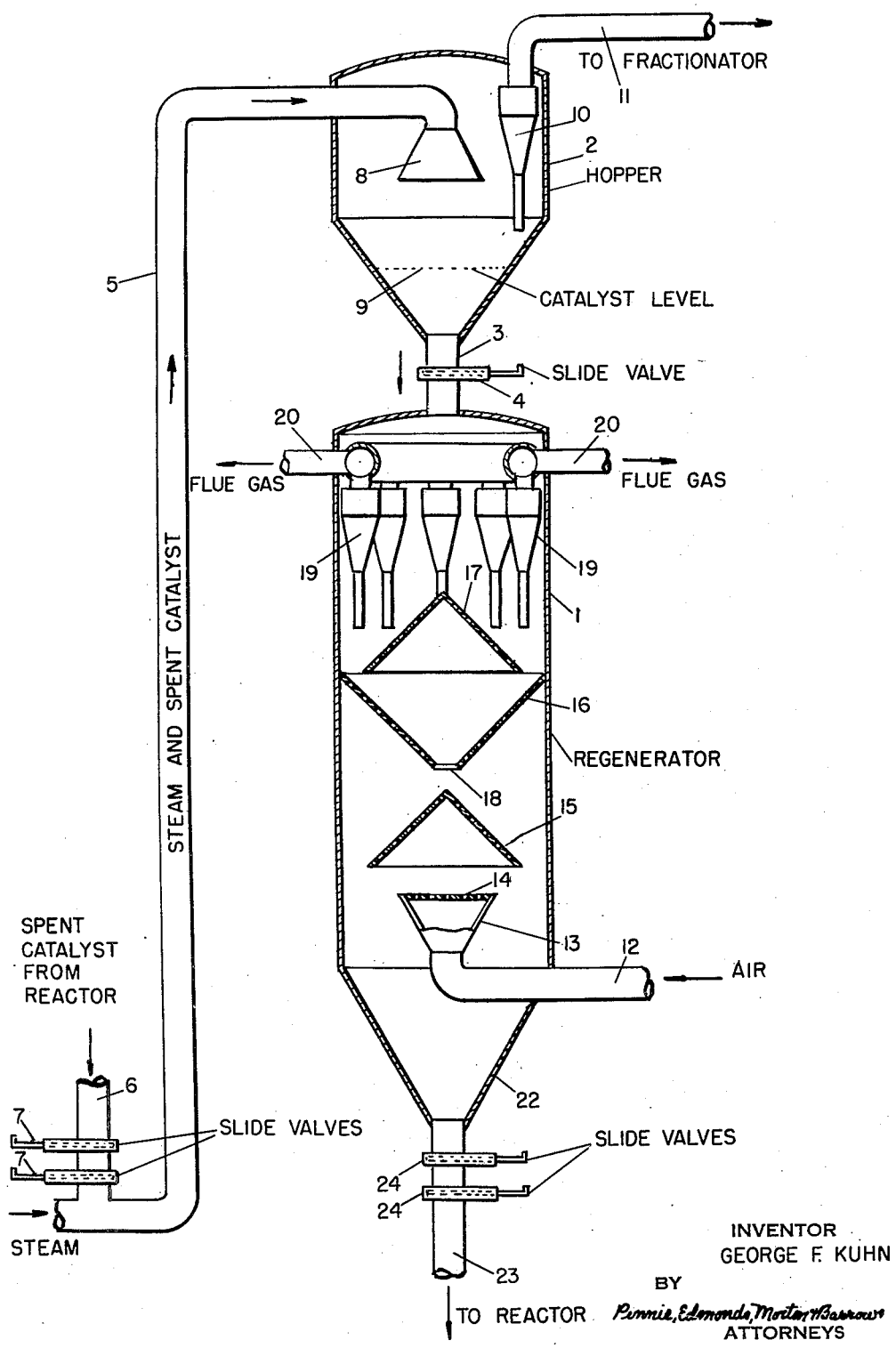

2,534,778

UNITED STATES PATENT OFFICE 2,534,778

APPARATUS FOR THE REGENERATION OF CATALYST FOR USE IN THE CONVERSION OF HYDROCARBONS

George F. Kuhn, Sinclair, Wyo., assignor to Sinclair Refining Company, New York, N. Y., a corporation of Maine Application June 21, 1947, Serial No. 756,289

2 Claims. (Cl. 23—288)

This invention relates to pyrolytic conversion of hydrocarbons and more particularly to pyrolytic conversion processes involving the use of catalysts.

In the conversion of hydrocarbon base stocks to produce products having desired properties, such as high octane number for use in gasoline, the stock is submitted to one of several processes, such as cracking, hydrogenation, dehydrogenation, etc., in the presence of a catalyst.

In my copending application Serial No. 756,288, filed June 21, 1947, I have disclosed and claimed a process in which spent fluid catalyst is conveyed by air to a container or hopper arranged over the regenerating chamber and the air, after separation from the catalyst by gravity, is delivered to the bottom of the regenerating chamber. The catalyst, flowing downwardly through the regenerating chamber by gravity, moves counter-current to the air which is delivered to the bottom of the regenerating chamber.

The operation of the present invention is an improvement over the process disclosed in said application in that the spent catalyst is conveyed to the container or hopper over the regenerating chamber by steam, the conduit, through which the steam and spent catalyst passes, acting as a stripping leg. The catalyst settles to the bottom of the chamber and the steam and stripped vapors are removed through a cyclone separator to fractionators. The catalyst is then delivered by gravity downwardly through the regenerator in counter-current flow to air delivered to the bottom of the regenerator.

The invention comprises apparatus consisting of a regenerating chamber with a hopper or container for the catalyst over the regenerating chamber, a delivery pipe connecting the two, a conduit to deliver steam and spent catalyst to the hopper or container, and means for delivering air to the bottom of the regenerating chamber.

In the accompanying drawing I have shown, more or less diagrammatically in vertical section, an organization of apparatus elements forming a suitable embodiment of the invention.

Referring to the drawing, the reference numeral 1 designates a regenerating chamber which is constructed in any suitable manner and is preferably provided with a firebrick lining (not shown). Over the chamber I provide a hopper or container 2 for the spent catalyst. This container is connected to the top of the regenerating chamber by a pipe 3 having a slide valve 4 arranged therein.

A pipe 5 communicates with the container 2. Spent catalyst from the reactor is delivered to the pipe 5 through a pipe 6 having a valve or valves 7 arranged therein. Superheated steam is delivered to the pipe 5 from any suitable source and the spent catalyst is conveyed into the container by the flow of steam. The end of pipe 5 within the container may be flared as indicated at 8. The pipe 5, between its end 8 and its junction with the pipe 6, is preferably of a suitable length, as shown, to act as a stripping leg for stripping oil from the spent catalyst.

As the catalyst, steam and oil vapors enter the container 2, the catalyst falls by gravity settling in the bottom of the container, as indicated at 9, and the steam and oil vapors pass through a cyclone separator 10 to pipe 11 through which they are conveyed to fractionators or other apparatus. Air is delivered to the regenerator adjacent the bottom through a pipe 12 and the end of this pipe is flared as at 13 and provided with a grid 14. A series of substantially conical grids 15, 16 and 17 are arranged within the regenerating chamber, the grids being preferably alternately reversed, that is, the grids 15 and 17 having their bases at the bottom and the grid 16 having its base at the top. The grid 16 is provided with a central opening 18 to permit catalytic material passing over this grid to fall upon the grid 15. One or more cyclone separators 19 are arranged in the upper part of the regenerating chamber and are connected to pipes 20 for discharge of flue gas. The catalyst passing through the regenerator collects in the bottom. The bottom of the regenerating chamber is preferably frusto-conical as indicated at 22 and is connected to a discharge pipe 23 having a valve or valves 24 therein.

In the regeneration of catalyst in the apparatus herein illustrated, the spent catalyst from the reactor in finely divided form is delivered from pipe 6 to pipe 5 by opening valves 7. Steam passing through the pipe 5 conveys the spent catalyst to the top of the container 2 and in passing through the pipe 5 the catalyst is stripped of oil vapors by the steam. In container 2 the catalyst settles to the bottom, as indicated by the dotted line 9, and the oil vapors and steam pass through the cyclone separator 10 to pipe 11.

Catalyst accumulated in the container 2 is fed into the top of the regenerating chamber by opening valve 4. The catalyst flows by gravity through the regenerating chamber in counter-current flow to air admitted through pipe 12.

The distributing grids 15, 16 and 17 provide intimate mixing of the catalyst and air and thus promote regeneration. The flue gases created by burning of the carbonaceous material on the catalyst particles passes through the cyclone separators 19 into the discharge pipes 20. The regenerating catalyst accumulates in the bottom 22 of the regenerating chamber. It is removed by opening the valves 24 permitting the catalyst to flow into the pipe 23 whence it is conveyed to a reactor for reuse.

I claim:

1. Apparatus of the character described comprising a vertically elongated regenerating chamber, a second chamber positioned at an elevation higher than that of the regenerating chamber, an elevator conduit leading to the upper chamber and adapted to convey a suspension of finely divided catalyst in steam thereto, a conduit leading from a lower zone of the upper chamber into the center of the upper end of the regenerating chamber and adapted to the gravitation of catalyst therethrough, a perforated conical baffle positioned in an upper zone of the regenerating chamber and having its apex directly below the conduit entering the upper end of said chamber, conduit means for delivering air to a lower zone of the regenerating chamber and conduit means for withdrawing catalyst from a lower zone and gaseous products of the regeneration from an upper zone of the regenerating chamber.

2. Apparatus in accordance with claim 1 in which the regenerating chamber is provided with a plurality of perforated cone-shaped baffles so constructed and arranged as to cause finely divided catalyst flowing downwardly through the chamber to move alternately toward and away from the periphery of the chamber.

GEORGE F. KUHN.

REFERENCES CITED

The following references are of record in the file of this patent:

UNITED STATES PATENTS

| Number | Name | Date |
|---|---|---|
| 2,398,759 | Angell | Apr. 23, 1946 |
| 2,414,852 | Burnside et al. | Jan. 28, 1947 |
| 2,440,620 | Taff | Apr. 27, 1948 |
| 2,440,623 | Voorhees | Apr. 27, 1948 |
| 2,444,128 | Anderson | June 29, 1948 |
| 2,465,255 | Moorman | Mar. 22, 1949 |

FOREIGN PATENTS

| Number | Country | Date |
|---|---|---|
| 574,892 | Great Britain | Jan. 24, 1946 |